March 26, 1957 M. WEISMAN 2,786,761
INFUSIBLE COFFEE BAG
Filed Feb. 9, 1953

INVENTOR.
Maurice Weisman
BY
his Attorney

United States Patent Office 2,786,761
Patented Mar. 26, 1957

2,786,761

INFUSIBLE COFFEE BAG

Maurice Weisman, Newton, Mass., assignor to Modern Coffees, Inc., Boston, Mass., a corporation of Massachusetts Application February 9, 1953, Serial No. 335,935

8 Claims. (Cl. 99—77.1)

The present invention relates to a bag formed of paper webs and containing granular material such as coffee, tea and the like for steeping in boiling water for individual servings.

Particular difficulty has been found in the manufacture of individual servings of coffee in bags. This difficulty stems from the fact that a great deal of ground coffee is required to make a single serving of coffee, approximately 150 to 200 grains of ground coffee being required for a single serving, whereas with tea, for instance, less than 50 grains are required. To put this amount of coffee into an ordinary paper web bag, such as is used in a tea bag, requires a bag much too large to be conveniently used for a normal coffee cup. It has been found that by pleating the webs forming the bag of the present invention that a bag may be made which holds a greater volume of coffee without increasing the length and width dimensions of the bag and that the bag may have a greater exposed surface area readily infusible when immersed in a cup of boiling water. It has further been found that these pleats may be arranged lengthwise with respect to the continuous strip of which the bag is made, which is generally designated as longitudinally of the bag and readily formed by securing their ends in the transverse seals of the bag which is across the continuous strip of which the bag is made.

These and other objects and advantages of the present invention will be more clearly understood when considered in conjunction with the accompanying drawings, in which.

Figure 1:
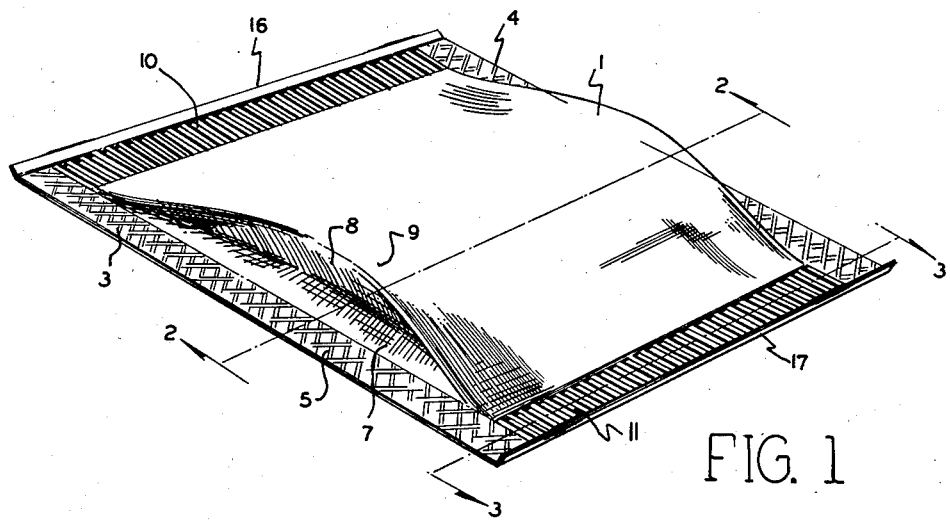
Figure 1 is a perspective view of the bag.
Figure 2:
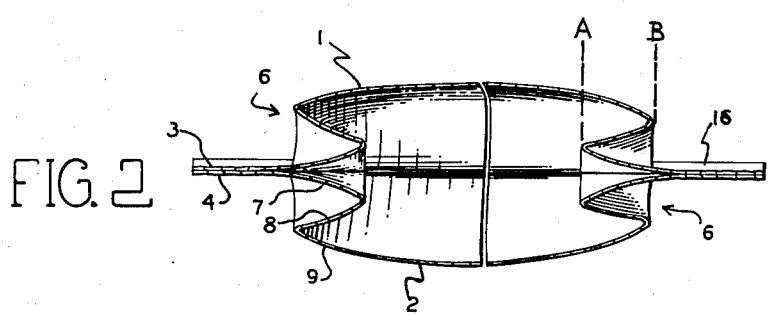
Figure 2 is a cross sectional elevation taken substantially on the line 2—2 of Figure 1.

The bag is formed of two sheets of paper web 1 and 2 which are made of infusible webbing material, which will support a weight of coffee or other granular material and will normally withstand heating with boiling water. This paper may further be made of thermoplastic synthetic fibers in which the fibers are randomly distributed providing large interstices offering easy access for water but blocking escape of the coffee grounds. The fibers while laying in random fashion throughout the web, nevertheless have a majority laid lengthwise of the strip from which the bag is made. The webs or papers may be sealed one layer to the next by the application of heat and/or pressure. These webs 1 and 2 forming opposite faces of the bag are sealed along their side edges 3 and 4, preferably by heat and pressure sealing. They may, however, if not thermoplastically sealed, be sealed by other suitable sealing means such as by a suitable adhesive, but the former method is preferable. In the sealing of these side edges, the webs may be drawn between sealing means having a knurled surface which imparts to the surface of the sealed edges, a knurled effect 5, which will normally increase the effectiveness of the sealing by subjecting the web to greater pressure along the knurling lines in the seal.

Longitudinal pleats at each side generally indicated by the numeral 6, are preferably formed in both webs. Each pleat has three layers, 7, 8 and 9, positioned one above the other. These layers extend on either side of the bag from one end to the other end and are secured at each end by the transverse sealing of the ends along the margins 10 and 11. These margins which are preferably sealed by sealing means which impart a serrated surface 12, to one face and a relatively smooth surface 13 on the other face, secure the pleatings in position.

Figure 3:
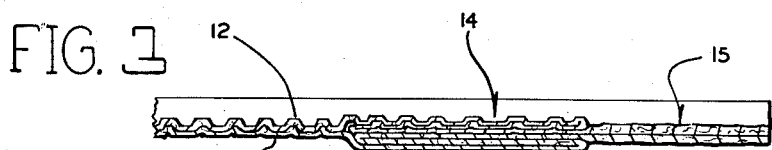
Figure 3 is an enlarged sectional view taken on the line 3—3 of Figure 1.

As shown in Figure 3, the pleatings of both webs are aligned, forming at both ends, six layers of material 14, for a distance preferably from just inside of the inner edge of the side marginal seals to a point short of the middle of the bag. In short, the width of the pleats is less than one-half the width of the bag. In the construction shown, and in practice, the pleat is secured across the ends of the bag for a width less than one-quarter the bag width and preferably about an eighth of the bag width. The marginal seals at all other places have but two layers of material 15. Since in forming these bags, the formers used in sealing and serrating the ends, exert greater pressure in the places where there are six layers of material in the end seals, these layers as will be noted are more densely pressed together than the sections where there are two layers of material. The greater relative pressure of the formers at these particular sections 14 will create a stronger bond than is obtained at other points in the bag. By pressing six layers of thermoplastic webbing together to a thickness substantially the same as two webs, a seal of solid thermoplastic or substantially solid thermoplastic material is obtained. This is especially desirable since these sections at which the pleats are secured must withstand the greatest stresses in the use of the bag.

It has been noted that a greater volume of material may be contained within the bag and a greater surface area be incorporated in the bag with the same longitudinal and width dimension. This may be accomplished by using relatively larger webs and increasing the size of the pleating. Thus the further apart points A and B are extended, the greater the size of the pleat and consequently, the greater volume and surface area.

In the forming of this bag, both ends have peripheral edge seals 16 and 17, which are turned in the same general direction with each other. These turned edges are formed by a sealing and cutting means which seals and cuts the bags from continuous lengths of paper webbing as an initial and final step in the manufacture and filling of the bags as disclosed in my copending application Serial No. 335,339, filed February 5, 1953, for Method and Apparatus of Making and Filling Coffee Bags.

Figure 4:
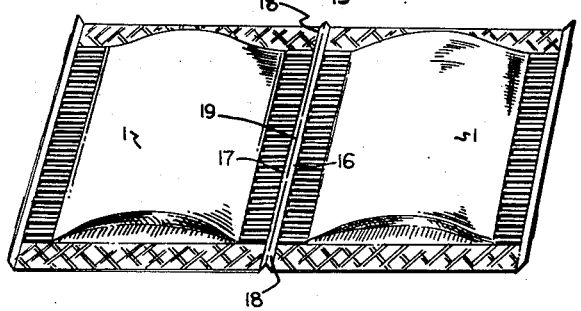
Figure 4 is a perspective view of a modification of the present invention.

Referring particularly to Figure 4, there are illustrated two bags joined together at the peripheral edge seals 16 of one, and 17 of the other by the narrow web section 18, intermittently interrupting the cut 19 which otherwise separates the two bags. Bags joined together in this manner may readily be packed in pairs or separated into individual bags for use.

Having now described my invention, I claim:

1. A water infusible bag containing a beverage infusion material comprising similar paper webs having sufficient strength to withstand normal wetting with boiling water sealed along the side in face to face relation, determining the sides of the bags, said paper webs having pleats substantially parallel to the sealed sides extending from one end of the bag to the other, said paper webs being sealed to form the ends of the bag with the ends of the pleats secured in folded thicknesses of the webs sealed in the end seals of the bag.

2. A water infusible bag containing coffee comprising similar paper webs having sufficient strength to withstand normal wetting with boiling water sealed along the sides of the webs and across the webs forming sides and ends of the coffee bag, a plurality of parallel pleats positioned in sections of the bag between the side seals and the middle position of the bag parallel to its sides, said pleats extending to the ends of the bag and being sealed in the end seal of the bag, said end seals having a plain surface in the face of one web and a serrated surface in the face of the opposing web.

3. A water infusible bag containing coffee comprising similar thermoplastic open paper webs having sufficient strength to withstand normal wetting with boiling water, thermoplastic seals formed by the webs in face to face relation along the sides and across the ends of the bags, a pleat formed in the face of the bag on each side having a width less than one-half the width of the bag extending from the side seals inward to the middle of the bag, said pleats having their folds continued into the end seals of the bag and forming a section of said end seals.

4. A water infusible bag containing coffee comprising similar thermoplastic open paper webs having sufficient strength to withstand normal wetting with boiling water, thermoplastic seals formed by the webs in face to face relation along the sides and across the ends of the bags, a pleat formed in each face of the bag on each side having a width less than one-half the width of the bag extending from the side seals inward to the middle of the bag, said pleats including three layers of webs having their ends terminating and sealed in the end seals of the bag.

5. A water infusible bag containing coffee comprising similar thermoplastic open paper webs having sufficient strength to withstand normal wetting with boiling water, thermoplastic seals formed by the webs in face to face relation along the sides and across the ends of the bag, a pleat formed in the face of the bag on each side having a width less than one-half the width of the bag extending from the side seals inward to the middle of the bag, said pleats having their folds continued into the end seals of the bag and forming a section of said end seals, said end seals having the surface of one of the webs serrated and that of the other web plain, with a narrow terminating section of each end seal smooth and curved normal to the surface of the bag.

6. A water infusible bag containing coffee comprising similar thermoplastic open paper webs having sufficient strength to withstand normal wetting with boiling water, thermoplastic seals formed by the webs in face to face relation along the sides and across the ends of the bags, a pleat formed in the face of the bag on each side having a width less than one-half the width of the bag extending from the side seals inward to the middle of the bag, said pleats having their folds continued into the end seals of the bag and forming a section of said end seals, said side seals having embossed surfaces on both faces of the web.

7. A bag containing a granular beverage infusion commodity, said bag being formed of two thermoplastic paper webs having sufficient strength to withstand normal wetting with boiling water, said two webs being sealed along their side edges and along transversely extending areas to form the side and end seals of the bag, a pleat formed in each face of the bag on each side thereof inwardly of the side seals, each pleat comprising three folds, two of the folds of each pleat extending inward of the side seals a distance less than half the width of the bag, the three folds of each of said pleats being sealed to each other at their opposite ends as integral parts of said end seals.

8. A bag containing a beverage infusion commodity in particle form, said bag comprising two rectangularly shaped thermoplastic sheets having sufficient strength to withstand normal wetting with boiling water, said sheets being in face to face relation and sealed to each other along their opposite side edges and their opposite end edges, each sheet inwardly of each side edge seal being folded longitudinally upon itself to form two side pleats, said pleats each comprising three superposed folds located inwardly of said side seals, said folds extending from one end edge to the opposite end edge of said bag, the three superposed folds of each pleat being sealed to each other at their opposite ends as part of the end edge seals of said bag.

References Cited in the file of this patent

UNITED STATES PATENTS

| | | |
|---|---|---|
| 904,083 | Parmenter | Nov. 17, 1908 |
| 2,186,087 | Yates | Jan. 9, 1940 |
| 2,377,118 | Weisman | May 29, 1945 |
| 2,466,281 | Shaw | Apr. 5, 1949 |
| 2,531,594 | Abrams | Nov. 28, 1950 |
| 2,627,341 | Morgan | Feb. 3, 1953 |
| 2,628,764 | Rubenstein et al. | Feb. 17, 1953 |
| 2,685,911 | Haller | Aug. 10, 1954 |